United States Patent
Arai et al.

(10) Patent No.: US 10,529,992 B2
(45) Date of Patent: Jan. 7, 2020

(54) SURFACE-TREATED COPPER FOIL, AND CURRENT COLLECTOR, ELECTRODE, AND BATTERY CELL USING THE SURFACE-TREATED COPPER FOIL

(71) Applicant: JX Nippon Mining & Metals Corporation, Tokyo (JP)

(72) Inventors: Hideta Arai, Ibaraki (JP); Atsushi Miki, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 146 days.

(21) Appl. No.: 15/884,451

(22) Filed: Jan. 31, 2018

(65) Prior Publication Data

US 2018/0226655 A1    Aug. 9, 2018

(30) Foreign Application Priority Data

Feb. 3, 2017    (JP) .................................. 2017-019053
Dec. 14, 2017    (JP) .................................. 2017-239834

(51) Int. Cl.
*H01M 4/66*    (2006.01)

(52) U.S. Cl.
CPC ........... *H01M 4/667* (2013.01); *H01M 4/661* (2013.01)

(58) Field of Classification Search
CPC combination set(s) only.
See application file for complete search history.

(56) References Cited

U.S. PATENT DOCUMENTS

| | | | |
|---|---|---|---|
| 8,187,723 B2 | 5/2012 | Matsunaga | |
| 8,304,091 B2 | 11/2012 | Matsunaga et al. | |
| 8,715,836 B2 | 5/2014 | Dobashi et al. | |
| 9,806,333 B2 * | 10/2017 | Hirose | H01M 4/1395 |
| 2004/0191560 A1 | 9/2004 | Matsuda et al. | |
| 2007/0141377 A1 * | 6/2007 | Hanafusa | H05K 9/0054 |
| | | | 428/606 |

(Continued)

FOREIGN PATENT DOCUMENTS

| | | |
|---|---|---|
| CN | 102884660 A | 1/2013 |
| CN | 105322226 A | 2/2016 |

(Continued)

OTHER PUBLICATIONS

Office Action in KR Application No. 2018-0011899 dated Nov. 7, 2018, 9 pages.

(Continued)

*Primary Examiner* — Kaity V Chandler

(74) *Attorney, Agent, or Firm* — Marshall, Gerstein & Borun LLP

(57) ABSTRACT

The invention provides a surface-treated copper foil for a battery cell that is capable of providing good adhesiveness to an active substance and undergoes less detachment of roughening particles.

The surface-treated copper foil for a battery cell according to one or more embodiments of the present application contains a copper foil and a surface treatment layer on at least one surface of the copper foil, wherein the surface treatment layer contains a primary particle layer and a secondary particle layer, and the surface of the surface treatment layer has a ten-point average roughness Rz of 1.8 μm or more measured with a laser microscope with a wavelength of 405 nm according to JIS B0601 1994.

16 Claims, 1 Drawing Sheet

(56) References Cited

U.S. PATENT DOCUMENTS

| | | | |
|---|---|---|---|
| 2008/0050652 A1* | 2/2008 | Hirose | H01M 2/0275 429/200 |
| 2009/0061326 A1* | 3/2009 | Hirose | H01M 2/0257 429/338 |
| 2010/0068511 A1 | 3/2010 | Matsunaga et al. | |
| 2011/0189501 A1* | 8/2011 | Fujisawa | B32B 15/08 428/623 |
| 2012/0111613 A1 | 5/2012 | Oguro et al. | |
| 2013/0011734 A1 | 1/2013 | Arai et al. | |
| 2013/0040162 A1* | 2/2013 | Fujisawa | B32B 15/01 428/607 |
| 2013/0071755 A1* | 3/2013 | Oguro | C23C 30/00 429/245 |
| 2013/0092548 A1* | 4/2013 | Tzou | H05K 3/384 205/152 |
| 2013/0108922 A1 | 5/2013 | Shinozaki et al. | |
| 2014/0017564 A1* | 1/2014 | Suzuki | C22F 1/08 429/211 |
| 2014/0030591 A1* | 1/2014 | Kohiki | C25D 1/04 429/211 |
| 2016/0036091 A1 | 2/2016 | Ohtomo et al. | |

FOREIGN PATENT DOCUMENTS

| | | | |
|---|---|---|---|
| EP | 1441046 | A1 | 7/2004 |
| EP | 1452627 | A2 | 9/2004 |
| EP | 2544282 | A1 | 1/2013 |
| EP | 2587574 | A1 | 5/2013 |
| JP | 3733067 | | 1/2006 |
| JP | 2008-111169 | A | 5/2008 |
| JP | 4828427 | B2 | 11/2011 |
| JP | 5024930 | B2 | 9/2012 |
| JP | 5046927 | B2 | 10/2012 |
| JP | 2013-019056 | | 1/2013 |
| JP | 5180815 | B2 | 4/2013 |
| KR | 20120098818 | A | 9/2012 |
| KR | 20150070380 | A | 6/2015 |
| WO | WO-2006/028207 | A1 | 3/2006 |
| WO | WO-2006/134868 | A1 | 12/2006 |
| WO | WO-2007/105635 | A1 | 9/2007 |
| WO | WO-2008/053878 | A1 | 5/2008 |
| WO | WO-2013/147116 | A1 | 10/2013 |

OTHER PUBLICATIONS

Office Action in PH Application No. 1-2018-000036 dated Sep. 13, 2018, 7 pages.

Extended European Search Report in EP Application No. 18154630.0 dated Apr. 16, 2018, 9 pages.

Office Action in TW Application No. 106145063 dated Jul. 17, 2018, 10 pages.

* cited by examiner

[Fig.1]
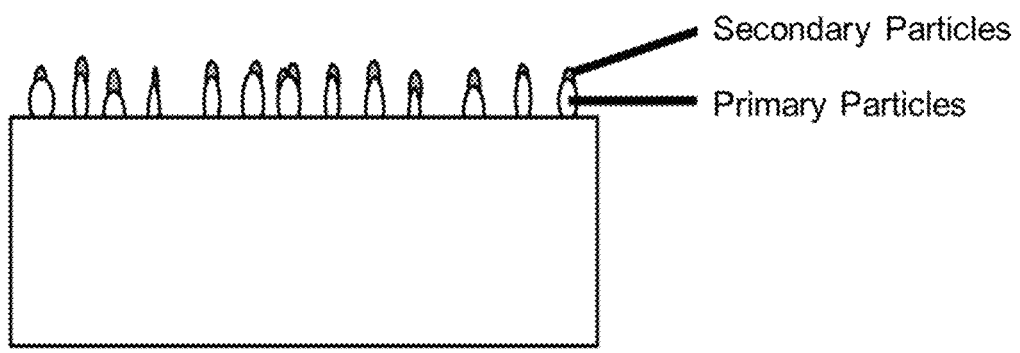
[Fig.2]
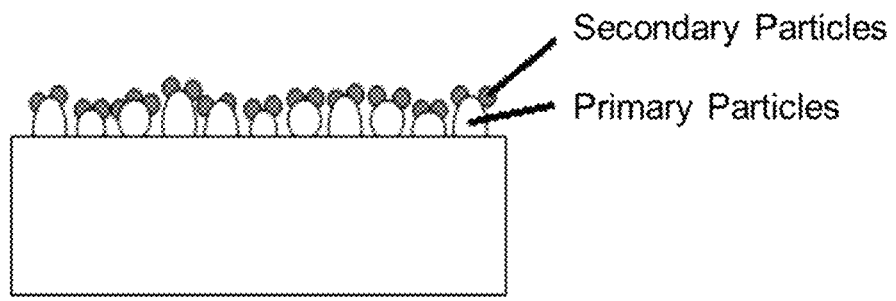

SURFACE-TREATED COPPER FOIL, AND CURRENT COLLECTOR, ELECTRODE, AND BATTERY CELL USING THE SURFACE-TREATED COPPER FOIL

TECHNICAL FIELD

One or more embodiments of the present application relate to a surface-treated copper foil, and a current collector, an electrode, and a battery cell, using the same.

BACKGROUND ART

As a current collector for a negative electrode or an electrode of a battery cell, particularly a secondary cell, a rolled copper foil and an electrolytic copper foil have been used. Any of the copper foils is demanded to have high adhesiveness between a positive electrode or negative electrode active substance and the copper foil as a current collector. For improving the adhesiveness, there are cases where a surface treatment for forming unevenness on the surface of the copper foil is performed. For example, as described in PTL 1, the surface of the copper foil is abraded with emery paper to form unevenness, which targets the improvement in adhesiveness.

CITATION LIST

Patent Literature

PTL 1: Japanese Patent No. 3,733,067

SUMMARY OF INVENTION

However, as described in PTL 1, even though unevenness is formed simply by abrading the copper foil with abrasive paper, such as emery paper, there is a problem that sufficient adhesiveness cannot be obtained between the current collector copper foil and the active substance.

Furthermore, in the case where unevenness is formed by providing a roughening treatment layer on a copper foil by roughening plating, there is a problem that the roughening particles of the roughening particle layer are frequently detached.

An object according to one or more embodiments of the present application is to provide a surface-treated copper foil for a battery cell that is capable of providing good adhesiveness to an active substance and undergoes less detachment of roughening particles.

Solution to Problem

The present inventors have earnestly investigated the factors failing to provide sufficient adhesiveness in the ordinary techniques, and have found a problem that roughening particles formed on the surface of the copper foil by a roughening treatment using a copper sulfate plating bath are heterogeneous due to accumulation of bloated roughening particles. Specifically, the roughening particles are detached as copper powder from the portion where the roughening particles are accumulated, thereby failing to provide sufficient adhesiveness between the current collector copper foil and the active substance. Under the circumstances, the inventors have found that the adhesiveness to an active substance is improved by controlling the ten-point average roughness Rz of the surface treatment layer obtained by forming a primary particle layer and a secondary particle layer on the surface of the copper foil. One or more embodiments of the present application have been completed based on the aforementioned knowledge.

One or more embodiments of the present application relate to a surface-treated copper foil for a battery cell, containing a copper foil and a surface treatment layer on at least one surface of the copper foil, wherein the surface treatment layer contains a primary particle layer and a secondary particle layer in this order from the side of the surface of the copper foil, and the surface of the surface treatment layer of the surface-treated copper foil for a battery cell has a ten-point average roughness Rz of 1.8 μm or more measured with a laser microscope with a wavelength of 405 nm according to JIS B0601 1994.

According to one or more embodiments of the present application, the surface of the surface treatment layer of the surface-treated copper foil for a battery cell has an arithmetic average roughness Ra of 0.26 μm or more measured with a laser microscope with a wavelength of 405 nm according to JIS B0601 1994.

According to one or more embodiments of the present application, the primary particle layer contains one or more selected from the group consisting of Cu, W, Ti, As, V, Mo, Ni, Co, Cr, Zn, P, and Sn.

According to one or more embodiments of the present application, the secondary particle layer contains one or more selected from the group consisting of Cu, W, Ti, As, V, Mo, Ni, Co, Cr, Zn, P, and Sn.

According to one or more embodiments of the present application, the surface treatment layer contains one or more selected from the group consisting of Cu, W, Ti, As, V, Mo, Ni, Co, Cr, Zn, P, and Sn in a total amount of 100 μg/dm$^2$ or more.

According to one or more embodiments of the present application, the surface treatment layer contains one or more selected from the group consisting of Cu, W, Ti, As, V, Mo, Ni, Co, Cr, Zn, P, and Sn in a total amount of 10,000 μg/dm$^2$ or less.

According to one or more embodiments of the present application, the surface treatment layer contains Ni, and a deposited amount of Ni is 100 μg/dm$^2$ or more.

According to one or more embodiments of the present application, the surface treatment layer contains Ni, and a deposited amount of Ni is 4,500 μg/dm$^2$ or less.

According to one or more embodiments of the present application, the surface treatment layer contains Co, and a deposited amount of Co is 100 μg/dm$^2$ or more.

According to one or more embodiments of the present application, the surface treatment layer contains Co, and a deposited amount of Co is 6,000 μg/dm$^2$ or less.

According to one or more embodiments of the present application, the primary particle layer is formed of Cu.

According to one or more embodiments of the present application, the secondary particle layer is formed of Cu, Co, and Ni.

According to one or more embodiments of the present application, the copper foil contains at least one selected from the group consisting of In, Au, Pd, Ag, Cr, Fe, P, Ti, Sn, Zn, Mn, Mo, Co, Ni, Si, Zr, B, and Mg in a total amount of 5 ppm by mass or more and 0.3% by mass or less.

According to one or more embodiments of the present application, the copper foil contains at least one selected from the group consisting of In, Au, Pd, Ag, Cr, Fe, P, Ti, Sn, Zn, Mn, Mo, Co, Ni, Si, Zr, B, and Mg in a total amount of 5 ppm by mass or more and 300 ppm by mass or less.

According to one or more embodiments of the present application, the copper foil contains at least one selected from the group consisting of In, Au, Pd, Ag, Cr, Fe, P, Ti, Sn, Zn, Mn, Mo, Co, Ni, Si, Zr, B, and Mg in a total amount of 301 ppm by mass or more and 0.3% by mass or less.

According to one or more embodiments of the present application, the surface treatment layer further contains one or more layer selected from the group consisting of a heat resistant layer, a rust preventing layer, a chromate treatment layer, a silane coupling treatment layer, a plated layer, and a resin layer, on the secondary particle layer.

According to one or more embodiments of the present application, the surface-treated copper foil for a battery cell is for a secondary cell.

According to one or more embodiments of the present application, the surface-treated copper foil for a battery cell is for a current collector of a secondary cell.

One or more embodiments of the present application also relate to a current collector containing the surface-treated copper foil for a battery cell.

One or more embodiments of the present application also relate to an electrode containing the surface-treated copper foil for a battery cell.

One or more embodiments of the present application also relate to a battery cell containing the surface-treated copper foil for a battery cell, the current collector, or the electrode.

Advantageous Effects of Invention

According to one or more embodiments of the present application, a surface-treated copper foil for a battery cell can be obtained that has good adhesiveness to an active substance and undergoes less detachment of roughening particles. According to one or more embodiments of the present application, a surface-treated copper foil for a battery cell can be obtained that has a surface treatment excellent in heat resistance characteristics.

BRIEF DESCRIPTION OF DRAWINGS

FIG. 1 is a conceptual illustration showing a state of roughening particles in the case where an ordinary roughening treatment is performed on a surface of a copper foil.

FIG. 2 is a conceptual illustration showing a state of a surface treatment layer of a surface-treated copper foil for a battery cell having a surface treatment layer according to one or more embodiments of the present application.

DESCRIPTION OF EMBODIMENTS

Surface-treated Copper Foil for Battery Cell

With the surface-treated copper foil (including a copper alloy foil) for a battery cell according to one or more embodiments of the present application, for example, as a current collector of a battery cell or a secondary cell, an active substance thin film may be formed thereon to produce an electrode, and finally a battery cell or a secondary cell can be produced with the electrode (which may be used as any of a positive electrode and a negative electrode). The method for forming the active substance thin film on the current collector is not particularly limited, and examples thereof include a CVD method, a sputtering method, a vapor deposition method, a thermal spraying method, a method of coating a liquid containing an active substance on the current collector, followed by drying, and a plating method. Among the methods for forming the thin film, a CVD method, a sputtering method, and a vapor deposition method are particularly preferably used. An intermediate layer may be formed on the current collector, and the active substance thin film may be formed on the intermediate layer. The surface-treated copper foil for a battery cell according to one or more embodiments of the present application can be used in a known electrode, a known current collector, and a known battery cell. Examples of the known battery cell include a lithium ion secondary cell, an all solid state secondary cell, an air cell (such as a lithium-air cell and a zinc-air cell), a sodium ion cell, a magnesium ion cell, a multivalent ion cell, a secondary cell using a sulfur substance in a positive electrode, a secondary cell using an organic material exhibiting a redox activity in a positive electrode, a nickel-cadmium cell, a manganese cell (dry cell battery), an alkali cell (dry cell battery), and a lithium cell (dry cell battery). Examples of the known electrode and the known current collector include electrodes and current collectors used in the aforementioned known battery cells.

Copper Foil

The form of the copper foil that can be used according to one or more embodiments of the present application is not particularly limited, and any known copper foil may be used. Typical examples of the copper foil used according to one or more embodiments of the present application include a copper foil formed by dry plating or wet plating, an electrolytic copper foil, and a rolled copper foil. An electrolytic copper foil is generally produced by electrodepositing copper from a copper sulfate plating bath onto a drum formed of titanium or stainless steel. A rolled copper foil is generally produced by repeating plastic working with a mill roll and a heat treatment. A rolled copper foil is frequently applied to a purpose that requires flexibility. In the case where the aforementioned copper foil, such as a rolled copper foil, is used, a copper foil subjected to an annealing treatment after the production of the copper foil, for example, after rolling, may also be used. A rolled copper foil having been subjected to an annealing treatment is preferred since the flexural resistance and the like may be enhanced.

Examples of the material used for the copper foil include a high purity copper material, such as tough pitch copper (JIS H3100, alloy number: C1100), oxygen-free copper (JIS H3100, alloy number: C1020, or JIS H3510, alloy number: C1011), phosphorus-deoxidized copper (JIS H3100, alloy number: C1201, C1220, or C1221), and electrolytic copper a copper alloy, such as Sn-containing copper, Ag-containing copper, a copper alloy containing the aforementioned high purity copper having added thereto one or more selected from the group consisting of In, Au, Pd, Ag, Cr, Fe, P, Ti, Sn, Zn, Mn, Mo, Co, Ni, Si, Zr, B, Mg, and the like, and a Corson copper alloy containing Ni, Si, and the like. A copper foil and a copper alloy foil each having a known composition may also be used. In the description herein, the term "copper foil" used solely encompasses a copper alloy foil. The material used for the copper foil may be a copper alloy containing the aforementioned high purity copper having one or more selected from the group consisting of In, Au, Pd, Ag, Cr, Fe, P, Ti, Sn, Zn, Mn, Mo, Co, Ni, Si, Zr, B, and Mg in a total amount of 5 ppm by mass or more, preferably 10 ppm by mass or more, preferably 15 ppm by mass or more, preferably 20 ppm by mass or more, preferably 25 ppm by mass or more, preferably 30 ppm by mass or more, preferably 35 ppm by mass or more, preferably 40 ppm by mass or more, preferably 45 ppm by mass or more, preferably 50 ppm by mass or more, preferably 301 ppm by mass or more, preferably 310 ppm by mass or more, preferably 350 ppm by mass or more, preferably 380 ppm by mass or more, preferably 400 ppm by mass or more, and preferably 500 ppm by mass or more. The material used for the copper foil may be a copper alloy containing the aforementioned high purity copper having one or more selected from the group consisting of In, Au, Pd, Ag, Cr, Fe, P, Ti, Sn, Zn, Mn, Mo, Co, Ni, Si, Zr, B, and Mg in a total amount of 50% by mass or less, preferably 40% by mass or less, preferably 30% by mass or less, preferably 20% by mass or less, preferably 10% by mass or less, preferably 5% by mass or less, preferably 1% by mass or less, preferably 0.8% by mass or less, preferably 0.6% by mass or less, preferably 0.5% by mass or less, preferably 0.3% by mass or less, preferably 0.28% by mass or less, preferably 0.25% by mass or less, preferably 0.23% by mass or less, preferably 0.20% by mass or less, preferably 0.17% by mass or less, preferably 0.15% by mass or less, and preferably 300 ppm by mass or less. The large total concentration of the one of more element selected from the group consisting of In, Au, Pd, Ag, Cr, Fe, P, Ti, Sn, Zn, Mn, Mo, Co, Ni, Si, Zr, B, and Mg (for example, 301 ppm by mass or more) added to the aforementioned high purity copper may be effective since the strength of the copper foil may be further increased. The small total concentration of the one of more element selected from the group consisting of In, Au, Pd, Ag, Cr, Fe, P, Ti, Sn, Zn, Mn, Mo, Co, Ni, Si, Zr, B, and Mg (for example, 300 ppm by mass or less) may be effective since good flexibility may be obtained.

Surface Treatment Layer

The surface treatment layer has a primary particle layer and a secondary particle layer in this order from the side of the copper foil. The surface treatment layer that has a primary particle layer and a secondary particle layer in this order from the side of the copper foil can decrease the powder drop caused by the detachment of the roughening particles. The surface treatment layer that has a primary particle layer and a secondary particle layer in this order from the side of the copper foil can also exert an effect of improving the adhesiveness between the copper foil and the active substance. It is estimated that the effects are obtained since the roughening particles are prevented from being flexed by providing the primary particle layer and the secondary particle layer. The surface treatment layer that has a primary particle layer and a secondary particle layer in this order from the side of the copper foil may enhance the heat resistance of the copper foil. The primary particle layer and the secondary particle layer each can be formed with an electroplated layer. The secondary particles have a feature where the secondary particle is one or plural particles grown on the primary particles. The secondary particle layer is a normal plated layer grown on the primary particle layer. The secondary particles may have a dendritic shape. Accordingly, in the case where the term "secondary particle layer" is used in the description herein, it is assumed that a normal plated layer, such as cover plating, is also encompassed. The secondary particle layer may be a layer having one or more layer formed of roughening particles, may be a layer having one or more normal plated layer, and may be a layer having one or more layer formed of roughening particles and one or more normal plated layer. The surface treatment layer may have one or plural layers other than the primary particle layer and the secondary particle layer. The normal plating herein means plating performed under a condition of a current density that is the critical current density or lower.

The primary particle layer is a layer containing roughening particles that are formed directly on the copper foil, and roughening particles that are accumulated on the roughening particles formed directly on the copper foil and have the same composition as the roughening particles formed directly on the copper foil or have the same elements as the elements contained in the roughening particles formed directly on the copper foil. The secondary particle layer is a layer containing roughening particles that are formed on the roughening particles contained in the primary particle layer and have a different composition from the roughening particles forming the primary particle layer or contain an element(s) that is not contained in the roughening particles forming the primary particle layer.

The primary particles and the secondary particles can be discriminated by the presence or absence of the elements constituting the primary particles and/or the secondary particles, and/or in the case where the concentrations or the deposited amounts of the elements cannot be measured, for example, in such a manner that in observation with a scanning electron microscope, particles that appear to overlap and are present on the side of the copper foil (i.e., on the lower layer) and particles that appear not to overlap are determined as the primary particles, and particles that appear to overlap and are present on the other particles are determined as the secondary particles. In the case where an underlying plated layer (normal plated layer), for example, of copper is provided on the copper foil, the "roughening particles that are formed directly on the copper foil" encompass the roughening particles that are formed directly on the underlying plated layer.

In the surface-treated copper foil for a battery cell according to one or more embodiments of the present application, the surface of the surface treatment layer has a ten-point average roughness Rz of 1.8 µm or more measured with a laser microscope with a wavelength of 405 nm according to JIS B0601 1994. When Rz is less than 1.8 pm, the roughening particles on the copper foil are distributed in a thin and long dendritic form as shown in the conceptual illustration of FIG. 1, and the particles in a thin and long dendritic form tend to be broken at a part of the dendritic portion by an external force, or are detached from the base thereby, failing to provide good adhesiveness to an active substance. When Rz is 1.8 µm or more, on the other hand, the sharp rising portions disappear, but particles having a roundish shape grow as shown in the conceptual illustration of FIG. 2, thereby preventing the breakage of the dendritic portion and the detachment from the base thereof. Consequently, the adhesiveness to an active substance is enhanced. From this standpoint, the ten-point average roughness Rz is more preferably 1.9 µm or more, more preferably 2.0 µm or more, further preferably 2.1 µm or more, further preferably 2.2 µm or more, further preferably 2.3 µm or more, and further preferably 2.35 µm or more. The upper limit of the ten-point average roughness Rz may not be particularly limited, and may be typically 10 µm or less, preferably 8 µm or less, further preferably 5 µm or less, further preferably 3.30 µm or less, further preferably 3.20 µm or less, further preferably 3.10 µm or less, further preferably 3.05 µm or less, further preferably 3 µm or less, further preferably 2.95 µm or less, further preferably 2.90 µm or less, further preferably 2.85 µm or less, and further preferably 2.80 µm or less. It is estimated that in the case where Rz is small to a certain extent, for example, 3 µm or less, the roughening particles are further prevented from being detached, thereby further enhancing the adhesiveness to an active substance. In the case where the surface treatment layer is present on both surfaces of the copper foil, the advantageous effects according to one or more embodiments of the present application can be exerted when the ten-point average roughness Rz of any one of them is in the range. Accordingly, it suffices that the ten-point average roughness Rz of any one of them is in the range, or the ten-point average roughness Rz of both of them each may be in the range.

In the case where the surface-treated copper foil for a battery cell has plural layers including the primary particle layer, the secondary particle layer, a heat resistant layer, a rust preventing layer, a chromate treatment layer, a silane coupling treatment layer, a plated layer, and the like, the "surface of the surface treatment layer" means the surface of the outermost layer of the plural layers.

From the same standpoint as above, in the surface-treated copper foil for a battery cell according to one or more embodiments of the present application, the surface treatment layer preferably has an arithmetic average roughness Ra of 0.26 µm or more measured with a laser microscope with a wavelength of 405 nm according to JIS B0601 1994. The arithmetic average roughness Ra is more preferably 0.28 µm or more, more preferably 0.30 µm or more, more preferably 0.32 µm or more, more preferably 0.34 µm or more, more preferably 0.36 µm or more, more preferably 0.38 µm or more, and further preferably 0.40 µm or more. The upper limit of the arithmetic average roughness Ra may not be particularly limited, and may be typically 5.0 µm or less, preferably 4.5 µm or less, further preferably 4.0 µm or less, further preferably 3.5 µm or less, further preferably 3.0 µm or less, further preferably 2.5 µm or less, further preferably 2.0 µm or less, further preferably 1.5 µm or less, further preferably 1.0 µm or less, further preferably 0.5 µm or less, further preferably 0.45 µm or less, further preferably 0.44 µm or less, further preferably 0.41 µm or less, and further preferably 0.40 µm or less. In the case where the surface treatment layer is present on both surfaces of the copper foil, the advantageous effects according to one or more embodiments of the present application can be exerted when the arithmetic average roughness Ra of any one of them is in the range. Accordingly, it suffices that the arithmetic average roughness Ra of any one of them is in the range, or the arithmetic average roughness Ra of both of them each may be in the range.

The primary particle layer preferably has an average particle diameter of from 0.1 to 0.6 µm. The secondary particle layer preferably has an average particle diameter of from 0.01 to 0.45 µm. The particle diameter herein means the diameter of the minimum circle that surrounds a particle in the case where the roughening particle is observed by taking a micrograph from immediately above the copper foil with a scanning electron microscope. The average particle diameter means the arithmetic average value of the particle diameters of the plural roughening particles. Specifically, the average particle diameter of the primary particle layer means the arithmetic average value of the particle diameters of the roughening particles of the primary particle layer that are present in a region of 4 µm in width×3 µm in length in the micrograph taken by a scanning electron microscope. The average particle diameter of the secondary particle layer means the arithmetic average value of the particle diameters of the roughening particles of the secondary particle layer that are present in a region of 4 µm in width×3 µm in length in the micrograph taken by a scanning electron microscope.

The average particle diameter of the primary particle layer can be increased, for example, in such a manner that in the formation of the primary particle layer, the concentration of the element that is to be deposited to the copper foil through plating in the plating solution used is decreased, and/or the current density is increased, and/or the surface treatment time (i.e., the electrification time in plating) is prolonged, and/or the number of times of plating is increased. The average particle diameter of the primary particle layer can be decreased, for example, in such a manner that in the formation of the primary particle layer, the concentration of the element that is to be deposited to the copper foil through plating in the plating solution used is increased, and/or the current density is decreased, and/or the surface treatment time (i.e., the electrification time in plating) is shortened, and/or the number of times of plating is decreased.

The average particle diameter of the secondary particle layer can be increased, for example, in such a manner that in the formation of the secondary particle layer, the concentration of the element that is to be deposited to the copper foil through plating in the plating solution used is decreased, and/or the current density is increased, and/or the surface treatment time (i.e., the electrification time in plating) is prolonged, and/or the number of times of plating is increased. The average particle diameter of the secondary particle layer can be decreased, for example, in such a manner that in the formation of the secondary particle layer, the concentration of the element that is to be deposited to the copper foil through plating in the plating solution used is increased, and/or the current density is decreased, and/or the surface treatment time (i.e., the electrification time in plating) is shortened, and/or the number of times of plating is decreased.

In the surface-treated copper foil for a battery cell according to one or more embodiments of the present application, the primary particle layer in the surface treatment layer may contain one kind or two or more kinds of elements selected from the group consisting of Cu, W, Ti, As, V, Mo, Ni, Co, Cr, Zn, P, and Sn. The primary particle layer in the surface treatment layer preferably contains one or more kinds of elements selected from the group consisting of Cu, W, Ti, As, Cr and P. The primary particle layer in the surface treatment layer preferably contains one or more kinds of elements selected from the group consisting of Cu, W, As, and P. This is because the powder drop is further prevented. The secondary particle layer may also contain one kind or two or more kinds of elements selected from the group consisting of Cu, W, Ti, As, V, Mo, Ni, Co, Cr, Zn, P, and Sn. The total deposited amount of one or more elements selected from the group consisting of Cu, W, Ti, As, V, Mo, Ni, Co, Cr, Zn, P, and Sn contained in the primary particle layer and the secondary particle layer may be, for example, 100 µg/dm$^2$ or more. The upper limit of the total deposited amount is not particularly limited, and may be, for example, 10,000 µg/dm$^2$ or less. The total deposited amounts of one kind or two or more kinds of elements selected from the group consisting of Cu, W, Ti, As, V, Mo, Ni, Co, Cr, Zn, P, and Sn contained in the primary particle layer and the secondary particle layer each may be, for example, 100 µg/dm$^2$ or more. The upper limits of the total deposited amounts each are not particularly limited, and each may be, for example, 10,000 µg/dm$^2$ or less.

From the standpoint of the enhancement of the cell capacity, it has been investigated that the electrode active substance is shifted from a simple carbonaceous substance to a silicon material and a composite active substance containing plural substances mixed. In the case where the silicon active substance is used, a polyimide binder may be used in some cases, in which heating to 300° C. or more is necessarily performed for binding. Therefore, the object of one or more embodiments of the present application can be achieved when good adhesiveness to the active substance can be obtained, and the copper foil for a current collector of a secondary cell preferably has such heat resistant characteristics that oxidative discoloration does not occur on the surface of the copper foil even after heating to 300° C. or more. The heat resistant characteristics can be enhanced by selecting one kind or two or more kinds of elements from the group consisting of Cu, W, Ti, As, V, Mo, Ni, Co, Cr, Zn, P, and Sn, and forming the secondary particle layer according to the aforementioned deposited amounts.

The surface treatment layer of the surface-treated copper foil for a battery cell includes a case where the surface treatment layer does not contain Ni, and a case where the surface treatment layer contains Ni. In the case where the surface treatment layer contains Ni, the deposited amount of Ni in the surface treatment layer is preferably 100 μg/dm$^2$ or more. When the deposited amount of Ni is less than 100 μg/dm$^2$, there may be a problem that the heat resistance is significantly deteriorated in some cases. In the case where the surface treatment layer contains Ni, the deposited amount of Ni in the surface treatment layer is preferably 4,500 μg/dm$^2$ or less. When the deposited amount exceeds 4,500 μg/dm$^2$, there may be a problem that the thickness of the Ni film is increased to increase the electric resistance, and the electric characteristics as the copper foil for a current collector may be decreased. The deposited amount of Ni is more preferably 200 μg/dm$^2$ or more, further preferably 300 μg/dm$^2$ or more, and further preferably 400 μg/dm$^2$ or more. The deposited amount of Ni is more preferably 4,400 μg/dm$^2$ or less, further preferably 4,300 μg/dm$^2$ or less, further preferably 4,200 μg/dm$^2$ or less, further preferably 4,100 μg/dm$^2$ or less, further preferably 4,000 μg/dm$^2$ or less, and further preferably 3,950 μg/dm$^2$ or less. In the case where the surface treatment layer contains Ni, such an effect may be exerted in some cases that the chemical resistance of the surface-treated copper foil may be enhanced as compared to the case where Ni is not contained.

The surface treatment layer of the surface-treated copper foil for a battery cell includes a case where the surface treatment layer does not contain Co, and a case where the surface treatment layer contains Co. In the case where the surface treatment layer contains Co, the deposited amount of Co in the surface treatment layer is preferably 100 μg/dm$^2$ or more. When the deposited amount of Co is less than 100 μg/dm$^2$, there may be a problem that the heat resistance is significantly deteriorated in some cases. In the case where the surface treatment layer contains Co, the deposited amount of Co in the surface treatment layer is preferably 6,000 μg/dm$^2$ or less. When the deposited amount exceeds 6,000 μg/dm$^2$, there may be a problem that the thickness of the Co film is increased to exhibit magnetism, and the electric characteristics as the copper foil for a battery cell, particularly as a copper foil for a current collector, may be deteriorated. The deposited amount of Co is more preferably 200 μg/dm$^2$ or more, further preferably 300 μg/dm$^2$ or more, more preferably 400 μg/dm$^2$ or more, more preferably 500 μg/dm$^2$ or more, more preferably 600 μg/dm$^2$ or more, more preferably 700 μg/dm$^2$ or more, more preferably 800 μg/dm$^2$ or more, more preferably 900 μg/dm$^2$ or more, and more preferably 1,000 μg/dm$^2$ or more. The deposited amount of Co is more preferably 5,500 μg/dm$^2$ or less, more preferably 5,000 μg/dm$^2$ or less, more preferably 4,500 μg/dm$^2$ or less, more preferably 4,300 μg/dm$^2$ or less, more preferably 4,200 μg/dm$^2$ or less, more preferably 4,100 μg/dm$^2$ or less, more preferably 4,000 μg/dm$^2$ or less, and more preferably 3,950 μg/dm$^2$ or less. In the case where the surface treatment layer contains Co, such an effect may be exerted in some cases that the weather resistance of the surface-treated copper foil may be enhanced as compared to the case where Co is not contained.

According to one or more embodiments of the present application, while the deposited amount of the elements, such as Cu, W, Ti, As, V, Mo, Ni, Co, Cr, Zn, P, and Sn, in the surface treatment layer is determined, this determines the total amount of the deposited amounts of the elements present in the surface treatment layer containing the primary particle layer and the secondary particle layer. In the case where the surface treatment layer is present on both surfaces of the copper foil, the determination is only for the surface treatment layer on one surface, but is not for the total value of the elements (such as Ni) contained in the surface treatment layers formed on both surfaces.

In the surface treatment layer of the surface-treated copper foil for a battery cell according to one or more embodiments of the present application, when the deposited amount of the elements, such as Cu, W, Ti, As, V, Mo, Ni, Co, Cr, Zn, P, and Sn, is in the aforementioned range, the kinds and the deposited amounts of the elements may be changed depending on necessity, and from the standpoint of the further enhancement of the adhesiveness to an active substance thin film, the primary particle layer is preferably formed of Cu. The expression that the "primary particle layer is formed of Cu" encompasses both the concept that the "primary particle layer contains only Cu" and the concept that the "primary particle layer contains only Cu and unavoidable impurities". From the standpoint of the enhancement of the heat resistance of the surface-treated copper foil, the secondary particle layer is preferably formed of Cu, Co, and Ni. The expression that the "secondary particle layer is formed of Cu, Co, and Ni" encompasses both the concept that the "secondary particle layer contains only Cu, Co, and Ni" and the concept that the "secondary particle layer contains only Cu, Co, and Ni, and unavoidable impurities".

The deposited amount of the element contained in the surface treatment layer can be increased, for example, in such a manner that the concentration of the element in the surface treatment solution used for forming the surface treatment layer is increased, and/or the current density is increased in the case where the surface treatment is plating, and/or the surface treatment time (i.e., the electrification time in plating) is prolonged. The deposited amount of the element contained in the surface treatment layer can be decreased, for example, in such a manner that the concentration of the element in the surface treatment solution used for forming the surface treatment layer is decreased, and/or the current density is decreased in the case where the surface treatment is plating, and/or the surface treatment time (i.e., the electrification time in plating) is shortened.

Formation Conditions of Primary Particle Layer and Secondary Particle Layer

In the surface treatment layer of the surface-treated copper foil for a battery cell according to one or more embodiments of the present application, the primary particle layer and the secondary particle layer are formed in this order from the side of the surface of the copper foil. The primary particle layer and the secondary particle layer may be formed directly from the side of the surface of the copper foil, or in alternative, after forming an underlying plated layer on the side of the surface of the copper foil, primary particle layer and the secondary particle layer may be then formed in this order. The underlying plated layer may be a Cu plated layer. While the formation conditions of the primary particle layer and the secondary particle layer are shown below, the conditions are only preferred examples, and any plating condition other than the following is not eliminated, as far as the surface of the surface treatment layer has a ten-point average roughness Rz of 1.8 μm or more measured with a laser microscope with a wavelength of 405 nm according to JIS B0601 1994.

The ten-point average roughness Rz of the surface of the surface treatment layer measured with a laser microscope with a wavelength of 405 nm according to JIS B0601 1994 can be increased, for example, in such a manner that in the formation of the primary particle layer and/or the secondary particle layer, the concentration of the element that is to be deposited to the copper foil through plating in the plating solution used is decreased, and/or the current density is increased, and/or the surface treatment time (i.e., the electrification time in plating) is prolonged, and/or the number of times of plating is increased. The ten-point average roughness Rz of the surface of the surface treatment layer measured with a laser microscope with a wavelength of 405 nm according to JIS B0601 1994 can be decreased, for example, in such a manner that in the formation of the primary particle layer and/or the secondary particle layer, the concentration of the element that is to be deposited to the copper foil through plating in the surface treatment solution used is increased, and/or the current density is decreased, and/or the surface treatment time (i.e., the electrification time in plating) is shortened.

The arithmetic average roughness Ra of the surface of the surface treatment layer measured with a laser microscope with a wavelength of 405 nm according to JIS B0601 1994 can be increased, for example, in such a manner that in the formation of the primary particle layer and/or the secondary particle layer, the concentration of the element that is to be deposited to the copper foil through plating in the plating solution used is decreased, and/or the current density is increased, and/or the surface treatment time (i.e., the electrification time in plating) is prolonged. The arithmetic average roughness Ra of the surface of the surface treatment layer measured with a laser microscope with a wavelength of 405 nm according to JIS B0601 1994 can be decreased, for example, in such a manner that in the formation of the primary particle layer and/or the secondary particle layer, the concentration of the element that is to be deposited to the copper foil through plating in the plating solution used is increased, and/or the current density is decreased, and/or the surface treatment time (i.e., the electrification time in plating) is shortened, and/or the number of times of plating is decreased.

Primary Particle Layer

The primary particle layer can be formed under the following condition in the case where the copper foil is treated with a primary particle plating solution (A) and then treated with a primary particle plating solution (B).

Treatment with Primary Particle Plating Solution (A)
　Composition of Electrolytic Solution
　　Copper: 5 to 15 g/L
　　Sulfuric acid: 70 to 80 g/L
　Production Condition
　　Current density: 40 to 60 A/dm$^2$
　　Temperature of electrolytic solution: 25 to 35° C.
　　Electrolysis time: 0.5 to 1.6 seconds
Treatment with Primary Particle Plating Solution (B)
　Composition of Electrolytic Solution
　　Copper: 20 to 50 g/L
　　Sulfuric acid: 60 to 100 g/L
　Production Condition
　　Current density: 4 to 10 A/dm$^2$
　　Temperature of electrolytic solution: 35 to 55° C.
　　Electrolysis time: 1.4 to 2.5 seconds The treatment may be performed under the condition shown in the following treatment 1 with the primary particle plating solution (I) or the following treatment 2 with the primary particle plating solution (I) in the case where the primary particle layer is formed only with a treatment with the primary particle plating solution (I).

Treatment 1 with Primary Particle Plating Solution (I)
　Composition of Electrolytic Solution
　　Copper: 10 to 45 g/L
　　Cobalt: 5 to 30 g/L
　　Nickel: 5 to 30 g/L
　　pH: 2.8 to 3.2
　Production Econdition
　　Current density: 30 to 45 A/dm$^2$
　　Temperature of electrolytic solution: 30 to 40° C.
　　Electrolysis time: 0.3 to 0.8 second
Treatment 2 with Primary Particle Plating Solution (I)
　Composition of Electrolytic Solution
　　Copper: 5 to 15 g/L
　　Nickel: 3 to 30 g/L
　　pH: 2.6 to 3.0
　Production Condition
　　Current density: 50 to 70 A/dm$^2$
　　Temperature of electrolytic solution: 30 to 40° C.
　　Electrolysis time: 0.3 to 0.9 second Secondary Particle Layer The secondary particle layer may be formed by a treatment with the following secondary particle plating solution (I) or the following secondary particle plating solution (II).

Treatment with Secondary Particle Plating Solution (I)
　Composition of Electrolytic Solution
　　Copper: 10 to 15 g/L
　　Cobalt: 5 to 15 g/L
　　Nickel: 5 to 15 g/L
　　pH: 2.8 to 3.2
　Production Condition
　　Current density: 20 to 40 A/dm$^2$
　　Temperature of electrolytic solution: 33 to 37° C.
　　Electrolysis time: 0.5 to 1.0 second
Treatment with Secondary Particle Plating Solution (II)
　Composition of Electrolytic Solution
　　Copper: 5 to 12 g/L
　　Nickel: 2 to 11 g/L
　　pH: 2.8
　Production Condition
　　Current density: 55 to 65 A/dm$^2$
　　Temperature of electrolytic solution: 35 to 40° C.
　　Electrolysis time: 0.3 to 0.9 second Cover Plating Cover plating may be performed on the secondary particle layer. With the cover plating formed, an effect of enhancing the heat resistance may be expected. Examples of a layer formed by the cover plating include a metal layer formed of at least one element selected from the group consisting of Zn, Cr, Ni, Fe, Ta, Cu, Al, P, W, Mn, Sn, As, Ti, Mo, Co, and the like, such as a Zn—Cr alloy layer, a Ni—Mo alloy layer, a Zn layer, a Co—Mo alloy layer, a Co—Ni alloy layer, a Ni—W alloy layer, a Ni—Zn alloy layer, a Ni—P alloy layer, a Ni—Fe alloy layer, a Ni—Al alloy layer, a Co—Zn alloy layer, a Co—P alloy layer, a Zn—Co alloy layer, a Ni layer, a Co layer, a Cr layer, an Al layer, a Sn layer, a Sn—Ni layer, a Ni—Sn layer, and a Zn—Ni alloy layer, an alloy layer containing two kinds or three kinds selected from the group consisting of Zn, Cr, Ni, Fe, Ta, Cu, Al, P, W, Mn, Sn, As, Ti, Mo, and Co, and an alloy layer formed of two kinds or three kinds of elements selected from the aforementioned element group.

The cover plating may be formed by a treatment with the following cover plating solution or the like, or by combining the treatment. A metal layer and/or an alloy layer that cannot be provided by wet plating can be provided by a dry plating method, such as sputtering, physical vapor deposition (PVD), and chemical vapor deposition (CVD).

Treatment (1) with Cover Plating Solution; Zn—Cr
  Composition of solution: potassium bichromate: 1 to 10 g/L, Zn: 0.1 to 5 g/L
  Solution temperature: 40 to 60° C.
  pH: 0.5 to 10
  Current density: 0.01 to 2.6 A/dm$^2$
  Electrification time: 0.05 to 30 seconds Treatment (2) with Cover Plating Solution; Ni—Mo
  Composition of solution: nickel sulfate: 270 to 280 g/L, nickel chloride: 35 to 45 g/L, nickel acetate: 10 to 20 g/L, sodium molybdate: 1 to 60 g/L, trisodium citrate: 10 to 50 g/L, sodium dodecylsulfate: 50 to 90 ppm
  Solution temperature: 20 to 65° C.
  pH: 4 to 12
  Current density: 0.5 to 5 A/dm$^2$
  Electrification time: 0.1 to 5 seconds Treatment (3) with Cover Plating Solution; Zn
  Composition of solution: Zn: 1 to 15 g/L
  Solution temperature: 25 to 50° C.
  pH: 2 to 6
  Current density: 0.5 to 5 A/dm$^2$
  Electrification time: 0.01 to 0.3 second Treatment (4) with Cover Plating Solution; Co—Mo
  Composition of solution: Co: 1 to 20 g/L, sodium molybdate: 1 to 60 g/L, sodium citrate: 10 to 110 g/L
  Solution temperature: 25 to 50° C.
  pH: 5 to 7
  Current density: 1 to 4 A/dm$^2$
  Electrification time: 0.1 to 5 seconds Treatment (5) with Cover Plating Solution; Co—Ni
  Composition of solution: Co: 1 to 20 g/L, Ni: 1 to 20 g/L
  Solution temperature: 30 to 80° C.
  pH: 1.5 to 3.5
  Current density: 1 to 20 A/dm$^2$
  Electrification time: 0.1 to 4 seconds Treatment (6) with Cover Plating Solution; Zn—Ni
  Composition of solution: Zn: 1 to 30 g/L, Ni: 1 to 30 g/L
  Solution temperature: 40 to 50° C.
  pH: 2 to 5
  Current density: 0.5 to 5 A/dm$^2$
  Electrification time: 0.01 to 0.3 second Treatment (7) with Cover Plating Solution; Ni—W
  Composition of solution: Ni: 1 to 30 g/L, W: 1 to 300 mg/L
  Solution temperature: 30 to 50° C.
  pH: 2 to 5
  Current density: 0.1 to 5 A/dm$^2$
  Electrification time: 0.01 to 0.3 second Treatment (8) with Cover Plating Solution; Ni—P
  Composition of solution: Ni: 1 to 30 g/L, P: 1 to 10 g/L
  Solution temperature: 30 to 50° C.
  pH: 2 to 5
  Current density: 0.1 to 5 A/dm$^2$
  Electrification time: 0.01 to 0.3 second Other Surface Treatments The surface treatment layer of the surface-treated copper foil for a battery cell according to one or more embodiments of the present application may further have, on the secondary particle layer or the cover plating layer, one or more layer selected from the group consisting of a heat resistant layer, a rust preventing layer, a chromate treatment layer, a silane coupling treatment layer, a plated layer, and a resin layer. The heat resistant layer, the rust preventing layer, the chromate treatment layer, the silane coupling treatment layer, the plated layer, and the resin layer each may have plural layers (for example, two or more layers and three or more layers) formed therein.

The heat resistant layer and the rust preventing layer used may be a known heat resistant layer and a known rust preventing layer respectively. For example, the heat resistant layer and/or the rust preventing layer may be a layer containing one or more element selected from the group consisting of nickel, zinc, tin, cobalt, molybdenum, copper, tungsten, phosphorus, arsenic, chromium, vanadium, titanium, aluminum, gold, silver, a platinum group element, iron, and tantalum, and may also be a metal layer or an alloy layer formed of one or more element selected from the group consisting of nickel, zinc, tin, cobalt, molybdenum, copper, tungsten, phosphorus, arsenic, chromium, vanadium, titanium, aluminum, gold, silver, a platinum group element, iron, and tantalum. The heat resistant layer and/or the rust preventing layer may contain an oxide, a nitride, and a silicide containing the aforementioned elements. The heat resistant layer and/or the rust preventing layer may be a layer containing a nickel-zinc alloy. The heat resistant layer and/or the rust preventing layer may be a nickel-zinc alloy layer. The nickel-zinc alloy layer may contain from 50 to 99% by weight of nickel and from 50 to 1% by weight of zinc except for unavoidable impurities. The total deposited amount of zinc and nickel of the nickel-zinc alloy layer may be from 5 to 1,000 mg/m$^2$, preferably from 10 to 500 mg/m$^2$, and preferably from 20 to 100 mg/m$^2$. The ratio of the deposited amount of nickel and the deposited amount of zinc (=(deposited amount of nickel)/(deposited amount of zinc)) of the layer containing a nickel-zinc alloy or the nickel-zinc alloy layer is preferably from 1.5 to 10. The deposited amount of nickel of the layer containing a nickel-zinc alloy or the nickel-zinc alloy layer is preferably from 0.5 mg/m$^2$ to 500 mg/m$^2$, and more preferably from 1 mg/m$^2$ to 50 mg/m$^2$. In the case where the heat resistant layer and/or the rust preventing layer is the layer containing a nickel-zinc alloy, the interface between the copper foil and a resin substrate is prevented from being corroded with a desmear solution when the inner wall of the through hole or the via hole is in contact with the desmear solution, and thus the adhesiveness between the copper foil and the resin substrate can be enhanced.

For example, the heat resistant layer and/or the rust preventing layer may be a layer containing a nickel or nickel alloy layer having an deposited amount of from 1 mg/m$^2$ to 100 mg/m$^2$, and preferably from 5 mg/m$^2$ to 50 mg/m$^2$, and a tin layer having an deposited amount of from 1 mg/m$^2$ to 80 mg/m$^2$, preferably from 5 mg/m$^2$ to 40 mg/m$^2$, which are laminated sequentially, and the nickel alloy layer may be constituted by any one of a nickel-molybdenum alloy, a nickel-zinc alloy, a nickel-molybdenum-cobalt alloy, and a nickel-tin alloy.

The chromate treatment layer herein means a layer treated with a liquid containing chromic anhydride, chromic acid, dichromic acid, a chromate salt, or a dichromate salt. The chromate treatment layer may contain such an element as Co, Fe, Ni, Mo, Zn, Ta, Cu, Al, P, W, Sn, As, Ti, and the like (which may be in any form of a metal, an alloy, an oxide, a nitride, a sulfide, and the like). Specific examples of the chromate treatment layer include a chromate treatment layer that is treated with an aqueous solution of chromic anhydride or potassium dichromate, and a chromate treatment layer that is treated with a treatment liquid containing chromic anhydride or potassium dichromate and zinc.

The silane coupling treatment layer may be formed by using a known silane coupling agent, and may be formed by using such a silane coupling agent as an epoxy silane, an amino silane, a methacryloxy silane, a mercapto silane, a vinyl silane, an imidazole silane, a triazine silane, and the like. The silane coupling agent used may be a mixture of two or more kinds thereof. Among these, the silane coupling treatment layer is preferably formed by using an amino silane coupling agent or an epoxy silane coupling agent.

The surface of the copper foil, the surface treatment layer, the heat resistant layer, the rust preventing layer, the silane coupling treatment layer, or the chromate treatment layer may be subjected to the surface treatments described in WO 2008/053878, JP-A-2008-111169, Japanese Patent No. 5,024,930, WO 2006/028207, Japanese Patent No. 4,828, 427, WO 2006/134868, Japanese Patent No. 5,046,927, WO 2007/105635, Japanese Patent No. 5,180,815, and JP-A-2013-19056. The surface of the copper foil, the surface treatment layer, the heat resistant layer, the rust preventing layer, the silane coupling treatment layer, or the chromate treatment layer may be subjected to various known surface treatments.

EXAMPLES

One or more embodiments of the present application will be described with reference to examples and comparative examples below. The examples are illustrative only, and one or more embodiments of the present application is not limited to the examples.

Primary Particle Layer and Secondary Particle Layer

An ingot having the composition shown in the column of "Composition of copper foil base material" in Table 1 was manufactured, and the ingot was hot rolled from 900° C. to provide a plate having a thickness of 10 mm. Thereafter, cold rolling and annealing were repeated, and the plate was finally cold rolled to a copper foil having a thickness of 12 µm, thereby providing a rolled copper foil. As an electrolytic copper foil of Example 7, HLP Foil, produced by JX Nippon Mining & Metals Corporation, having a thickness of 9 µm was prepared.

In the column of "Composition of copper foil base material" in Table 1, TCP means tough pitch copper (JIS H3100, alloy number: C1100), and OFC means oxygen-free copper (JIS H3100, alloy number: C1020). Specifically, for example, "190 ppm Ag-TPC" of Example 2 means that 190 ppm by mass of Ag was added to tough pitch copper. For example, "1200 ppm Sn-OFC" of Example 4 means that 1,200 ppm of Sn was added to oxygen-free copper.

Subsequently, the surface of the rolled copper foil or the surface of the electrolytic copper foil on the side of the matte surface (deposition surface or M surface) was subjected to electrolytic degreasing, water rinsing, and acid cleaning, and then a primary particle layer and/or a secondary particle layer were formed on the surface of the copper foil base material under the condition shown in Table 1. In Table 1, Examples and Comparative Examples shown with "Primary particle layer plating current condition A" and "Primary particle layer plating current condition B" mean that the plating under the condition shown in A was performed, and then the plating under the condition shown in B was performed. The conditions of the plating solutions for forming the primary particle layer and the secondary particle layer are shown in the columns of "Primary particle layer plating solution A", "Primary particle layer plating solution B", and "Secondary particle layer plating solution" in Table 1, and in the following. For example, the case where (1) is shown in the column of "Primary particle layer plating solution A" means that the primary particle layer A was formed by using the "Plating solution (1)" of the "Plating solution condition in formation of primary particle layer A" below.

Plating Solution Condition in Formation of Primary Particle Layer A
Plating Solution (1)
  Composition of solution: copper: 11 g/L, sulfuric acid: 50 g/L
  Solution temperature: 25° C.
  pH: 1.0 to 2.0
Plating Solution (2)
  Composition of solution: copper: 11 g/L, tungsten: 3 mg/L, sulfuric acid: 50 g/L
  Solution temperature: 25° C.
  pH: 1.0 to 2.0
Plating Solution (3)
  Composition of solution: copper: 11 g/L, arsenic: 100 mg/L, sulfuric acid: 50 g/L
  Solution temperature: 25° C.
  pH: 1.0 to 2.0
Plating Solution (4)
  Composition of solution: copper: 11 g/L, titanium: 6 mg/L, sulfuric acid: 50 g/L
  Solution temperature: 25° C.
  pH: 1.0 to 2.0
Plating Solution (5)
  Composition of solution: copper: 11 g/L, chromium: 3 mg/L, sulfuric acid: 50 g/L
  Solution temperature: 25° C.
  pH: 1.0 to 2.0
Plating Solution Condition in Formation of Primary Particle Layer B
Plating Solution (1)
  Composition of solution: copper: 22 g/L, sulfuric acid: 100 g/L
  Solution temperature: 50° C.
  pH: 1.0 to 2.0
Plating Solution Condition in Formation of Secondary Particle Layer
Plating Solution (1)
  Composition of solution: copper: 15 g/L, nickel: 8 g/L, cobalt: 8 g/L
  Solution temperature: 36° C.
  pH: 2.7
Plating Solution (2)
  Composition of solution: copper: 15 g/L, nickel: 8 g/L, phosphorus: 1 g/L
  Solution temperature: 36° C.
  pH: 2 to 3
Plating Solution (3)
  Composition of solution: copper: 15 g/L, nickel: 8 g/L, cobalt: 8 g/L, molybdenum: 8 g/L
  Solution temperature: 36° C.
  pH: 2 to 3
Plating Solution (4)
  Composition of solution: copper: 15 g/L, nickel: 8 g/L, tungsten: 3 g/L
  Solution temperature: 36° C.
  pH: 2 to 3
Plating Solution (5)
  Composition of solution: copper: 15 g/L, molybdenum: 8 g/L, cobalt: 8 g/L
  Solution temperature: 36° C.
  pH: 2 to 3

Cover Plating

Subsequently, cover plating shown in Table 1 was formed on the primary particle layer for the copper foil having only the primary particle layer formed or on the secondary particle layer for the copper foil having the primary particle layer and the secondary particle layer. The specific conditions therefor are shown below.

(1) Ni Layer
Composition of plating solution: Ni: 10 g/L
pH: 2.5
Temperature: 50° C.
Current density Dk: 12 A/dm$^2$
Plating time: 0.5 second
Number of times of plating: 2

(2) Ni—Co Alloy Layer
Composition of plating bath: Ni: 10 g/L, Co: 5 g/L
pH: 2.5
Temperature: 50° C.
Current density Dk: 10 A/dm$^2$
Plating time: 0.5 second
Number of times of plating: 2

(3) Ni—Zn Alloy Layer
Composition of plating bath: Ni: 10 g/L, Zn: 5 g/L
pH: 3.5
Temperature: 40° C.
Current density Dk: 2 A/dm$^2$
Plating time: 1 second
Number of times of plating: 2

Electrolytic Chromate Treatment

After forming the cover plating, the following electrolytic chromate treatment was performed for Examples 1 to 7 and Comparative Examples 2 and 3.

Composition of solution: potassium bichromate: 3 g/L, Zn: 0.5 g/L
Solution temperature: 40 to 60° C.
pH: 4.0
Current density Dk: 2.0 A/dm$^2$
Plating time: 0.6 second
Number of times of plating: 2

Silane Coupling Treatment

In Examples 1 to 7 and Comparative Examples 2 and 3, the following silane coupling treatment was performed after performing the electrolytic chromate treatment.

Silane coupling agent: N-2-(aminoethyl)-3-aminopropyl-trimethoxysilane
Concentration of silane coupling agent: 1.0% by volume
Treatment temperature: 25° C.
Treatment time: 3 seconds In Comparative Example 4, as shown in Table 1, instead of the formation of the primary particle layer and the secondary particle layer formed under the aforementioned prescribed condition, the surface having been subjected to temper rolling with a mill roll having a roughened surface was subjected to a thermal oxidation treatment in the air atmosphere and then subjected to a thermal reduction treatment in a nitrogen atmosphere containing 1% of CO.

In Comparative Example 5, as shown in Table 1, instead of the formation of the primary particle layer and the secondary particle layer formed under the aforementioned prescribed condition, the first Cu plating, the second Cu plating, and the third Cu plating were performed in this order under the following conditions.

First Cu Plating Condition
Composition of plating bath: Cu: 150 g/L to 250 g/L, sulfuric acid: 100 g/L
pH: 1.0
Temperature: 40° C.
Current density Dk: 5 A/dm$^2$
Plating time: 7 seconds
Number of times of plating: 1

Second Cu Plating Condition
Composition of plating bath: Cu: 50 g/L to 150 g/L, sulfuric acid: 130 g/L
pH: 1.0
Temperature: 25° C.
Current density Dk: 40 A/dm$^2$
Plating time: 7 seconds
Number of times of plating: 1

Third Cu Plating Condition
Composition of plating bath: Cu: 150 g/L to 250 g/L, sulfuric acid: 100 g/L
pH: 1.0
Temperature: 40° C.
Current density Dk: 5 A/dm$^2$
Plating time: 7 seconds
Number of times of plating: 1

Measurement of Ten-point Average Roughness Rz

Each of the copper foils having been subjected to the surface treatment in the experimental examples were measured for the surface roughness Rz with a laser microscope, OLS 4000, produced by Olympus Corporation. The value Rz is in accordance with JIS B0601 1994. The measurement was performed 10 times at 10 different positions under conditions of an objective lens with magnification of 50, and an evaluation length of 258 μm and a cutoff value of 0 in the observation of the surface of the copper foil. The measurement of the rolled copper foil was performed in the direction perpendicular to the rolling direction (Transverse Direction: TD), or the measurement of the electrolytic copper foil was performed in the direction perpendicular to the traveling direction of the electrolytic copper foil in the production equipment of the electrolytic copper foil (Transverse Direction: TD), and the average value of the 10 times measurements was obtained. The temperature of the measurement environment of the surface roughness Rz with the laser microscope was from 23 to 25° C. The copper foil having the surface treatment layers on both surfaces thereof had the same values of the ten-point average roughness Rz on both surfaces.

Measurement of Arithmetic Average Roughness Ra

Each of the copper foils having been subjected to the surface treatment in the experimental examples were measured for the surface roughness Ra with a laser microscope, OLS 4000, produced by Olympus Corporation. The value Ra is in accordance with JIS B0601 1994. The measurement was performed 10 times at 10 different positions under conditions of an objective lens with magnification of 50, and an evaluation length of 258 μm and a cutoff value of 0 in the observation of the surface of the copper foil. The measurement of the rolled copper foil was performed in the direction perpendicular to the rolling direction (Transverse Direction: TD), or the measurement of the electrolytic copper foil was performed in the direction perpendicular to the traveling direction of the electrolytic copper foil in the production equipment of the electrolytic copper foil (Transverse Direction: TD), and the average value of the 10 times measurements was obtained. The temperature of the measurement environment of the surface roughness Ra with the laser microscope was from 23 to 25° C. The copper foil having the surface treatment layers on both surfaces thereof had the same values of the arithmetic average roughness Ra on both surfaces.

Measurement of Deposited Amounts of Co, Ni, and Other Elements

The deposited amounts of Co, Ni, and other elements were measured in such a manner that the surface treatment layer of the copper foil specimen was dissolved in a nitric acid aqueous solution having a concentration of 20% by mass, and the solution was measured by ICP emission spectroscopy. In Examples and Comparative Examples where the surface treatment layers were formed on both surfaces of the copper foil, one of the surfaces was masked with an acid resistant tape or the like, and the surface treatment layer on the other surface was dissolved and measured for the deposited amounts of Co, Ni, and other elements. Thereafter, the masking was removed, and then the masked surface was measured for the deposited amounts of Co, Ni, and other elements, or the surface was measured for the deposited amounts of Co, Ni, and other elements using another specimen. The values shown in Table 1 each are the value for one surface. The copper foil having the same surface treatment layers on both surfaces thereof had the same values of the deposited amounts of Co, Ni, and other elements on both surfaces. In the case where Co, Ni, and other elements are not dissolved in a nitric acid aqueous solution having a concentration of 20% by mass, Co, Ni, and other elements may be dissolved in a liquid capable of dissolving them, and then the solution may be measured by the above mentioned ICP emission spectroscopy. The liquid capable of dissolving Co, Ni, and other elements may be a known liquid, a known acidic liquid, or a known alkaline liquid.

Evaluation of Particle Detachment (1) Tape Test

A transparent adhesive mending tape was adhered on the surface of the surface-treated copper foil on the side having been surface-treated, and the tape was peeled at an angle of 180°, at which the powder detachment was evaluated by the state of discoloration of the tape with the detached particles attached to the adhesive surface of the tape. The case where the tape was not discolored was evaluated as "S", the case where the tape was discolored gray was evaluated as "A", and the case where the tape was discolored black was evaluated as "C".

(2) Confirmation of Transfer Roll

In the production process of a secondary cell, a roll-to-roll transfer line is used on coating an electrode active substance on a copper foil for a current collector. Therefore, a problem may arise when the roughening particles of the surface treatment of a copper foil for a current collector are detached onto the roll of the transfer line. It is a frequently used procedure that with a slitting device for regulating the product width of the copper foil for a current collector, the transfer roll is cleaned every several thousand meters of the copper foil transferred. The yield was evaluated by the contamination state of the roll. The state where the roll was substantially not contaminated was evaluated as "S", the state where slight fixation was found was evaluated as "A", and the state where the roll was significantly contaminated was evaluated as "C".

Evaluation of Adhesiveness to Active Substance.

The adhesiveness to an active substance was evaluated in the following manner.

(1) Artificial graphite having an average diameter of 9 μm and polyvinylidene fluoride were mixed at 1/9 by weight, and the mixture was dispersed in N-methyl-2-pyrrolidone as a solvent.

(2) The active substance was coated on the surface of the copper foil.

(3) The copper foil having the active substance coated thereon was heated to 90° C. for 30 minutes in a dryer. At this time, the unreacted silane coupling agent is substantially not reacted with the copper surface since no OH group is bonded to the copper surface.

(4) After drying, the copper foil was cut into a 20 mm square, and pressed under a load of 1.5 ton/mm$^2$ for 20 seconds.

(5) The surface of the specimen was cut into a grid pattern with a cutter, on which a commercially available adhesive tape (Cellotape (trade name)) was adhered, and the adhesive tape was press-adhered thereon by placing a roller having a weight of 2 kg thereon and reciprocating the roller once.

(6) The adhesive tape was peeled, and the image of the active substance remaining on the surface of the copper foil was incorporated into a PC and digitized, by which the metallic glossy portion of the copper surface and the black portion with the active substance remaining were distinguished, and the residual ratio of the active substance was calculated. The average value of three specimens was designated as the residual ratio. In the evaluation of the adhesiveness to an active substance, a residual ratio of less than 50% was evaluated as "C", a residual ratio of 50% or more and less than 70% was evaluated as "B", a residual ratio of 70% or more and less than 80% was evaluated as "A", a residual ratio of 80% or more and less than 90% was evaluated as "S", and a residual ratio of 90% or more was evaluated as "SS".

Evaluation of Heat Resistance

The surface-treated copper foil was cut into a size of 20 cm×20 cm, the cut specimen of the copper foil was placed in an oven heated to 300° C., and after 15 seconds, the specimen of the copper foil was taken out from the oven and evaluated for the extent of oxidative discoloration of the surface treatment. A specimen having no oxidative discoloration occurring was evaluated as "A", a specimen having blackish oxidative discoloration occurring in less than 30% of the size of 20 cm×20 cm was evaluated as "B", and a specimen having blackish oxidative discoloration occurring in 30% or more thereof was evaluated as "C".

TABLE 1

| | Composition of copper foil base material (ppm by mass) | Thickness of copper foil base material (μm) | Surface treatment | Plating solution A for primary particle layer | Plating current condition A for primary particle layer | | | Plating solution B for primary particle layer |
|---|---|---|---|---|---|---|---|---|
| | | | | | Current density (A/dm$^2$) | Plating time (second) | Number of times of plating | |
| Example 1 | TPC | 12 | one surface | (1) | 48 | 0.7 | 2 | (1) |
| Example 2 | 190 ppmAg-TPC | 12 | one surface | (1) | 45 | 0.7 | 2 | (1) |
| Example 3 | 100 ppmAg-OFC | 12 | one surface | (1) | 53 | 0.6 | 2 | (1) |
| Example 4 | 1200 ppmSn-OFC | 12 | both surfaces | (1) | 48 | 0.8 | 2 | (1) |
| Example 5 | 1200 ppmSn-OFC | 12 | both surfaces | (1) | 55 | 0.7 | 2 | (1) |
| Example 6 | 190 ppmAg-TPC | 12 | one surface | (1) | 43 | 0.6 | 2 | (1) |
| Example 7 | electrolytic copper foil | 9 | one surface | (1) | 53 | 0.6 | 2 | (1) |
| Example 8 | TPC | 10 | one surface | (2) | 48 | 0.7 | 2 | (1) |

TABLE 1-continued

| | | | | | | | | |
|---|---|---|---|---|---|---|---|---|
| Example 9 | 190 ppmAg-TPC | 6 | one surface | (3) | 45 | 0.7 | 2 | (1) |
| Example 10 | 100 ppmAg-OFC | 35 | one surface | (4) | 53 | 0.6 | 2 | (1) |
| Example 11 | 1200 ppmZr-2000 ppmCr-OFC | 18 | both surfaces | (5) | 48 | 0.8 | 2 | (1) |
| Example 12 | 1200 ppmSn-OFC | 10 | both surfaces | (1) | 55 | 0.7 | 2 | (1) |
| Example 13 | 190 ppmAg-TPC | 12 | one surface | (1) | 43 | 0.6 | 2 | (1) |
| Example 14 | electrolytic copper foil | 9 | one surface | (1) | 53 | 0.6 | 2 | (1) |
| Comparative Example 1 | TPC | 12 | both surfaces | (1) | 68 | 1 | 2 | (1) |
| Comparative Example 2 | TPC | 12 | both surfaces | — | — | — | — | — |
| Comparative Example 3 | 190 ppmAg-TPC | 12 | one surface | (1) | 30 | 0.7 | 2 | (1) |
| Comparative Example 4 | TPC | 12 | both surfaces | The surface having been subjected to temper rolling with a roughening roll was subjected to a thermal oxidation treatment in the air atmosphere and then subjected to a thermal reduction treatment in a nitrogen atmosphere containing 1% of CO. | | | | |
| Comparative Example 5 | TPC | 12 | one surface | first Cu plating + second Cu plating + third Cu plating | | | | |

| | Plating current condition B for primary particle layer | | | Plating solution for secondary particle layer | Plating current condition for secondary particle layer | | |
|---|---|---|---|---|---|---|---|
| | Current density (A/dm$^2$) | Plating time (second) | Number of times of plating | | Current density (A/dm$^2$) | Plating time (second) | Number of times of plating |
| Example 1 | 5 | 1.5 | 2 | (1) | 26 | 0.6 | 2 |
| Example 2 | 5 | 1.5 | 2 | (1) | 23 | 0.5 | 2 |
| Example 3 | 5 | 1.5 | 2 | (1) | 24 | 0.7 | 2 |
| Example 4 | 5 | 1.5 | 2 | (1) | 27 | 0.8 | 2 |
| Example 5 | 5 | 1.5 | 2 | (1) | 23 | 0.5 | 2 |
| Example 6 | 8 | 1.5 | 2 | (1) | 23 | 0.5 | 2 |
| Example 7 | 5 | 1.5 | 2 | (1) | 24 | 0.7 | 2 |
| Example 8 | 5 | 1.5 | 2 | (1) | 26 | 0.6 | 2 |
| Example 9 | 5 | 1.5 | 2 | (5) | 23 | 0.5 | 2 |
| Example 10 | 5 | 1.5 | 2 | (1) | 24 | 0.7 | 2 |
| Example 11 | 5 | 1.5 | 2 | (1) | 27 | 0.8 | 2 |
| Example 12 | 5 | 1.5 | 2 | (2) | 23 | 0.5 | 2 |
| Example 13 | 8 | 1.5 | 2 | (3) | 23 | 0.5 | 2 |
| Example 14 | 5 | 1.5 | 2 | (4) | 24 | 0.7 | 2 |
| Comparative Example 1 | 10 | 2 | 2 | — | — | — | — |
| Comparative Example 2 | — | — | — | (1) | 35 | 2 | 1 |
| Comparative Example 3 | 5 | 1.5 | 2 | (1) | 20 | 0.5 | 1 |
| Comparative Example 4 | The surface having been subjected to temper rolling with a roughening roll was subjected to a thermal oxidation treatment in the air atmosphere and then subjected to a thermal reduction treatment in a nitrogen atmosphere containing 1% of CO. | | | | | | |
| Comparative Example 5 | first Cu plating + second Cu plating + third Cu plating | | | | | | |

| | Cover plating | Attached amount of Ni (μg/dm$^2$) | Attached amount of Co (μg/dm$^2$) | Attached amounts of elements other than Cu, Ni, Co (μg/dm$^2$) | Surface roughness Rz (JIS1994) (μm) | Surface roughness Ra (JIS1994) (μm) |
|---|---|---|---|---|---|---|
| Example 1 | Ni—Co alloy plating | 700 | 1950 | Cr: 18, Zn: 60 | 2.40 | 0.37 |
| Example 2 | Ni—Co alloy plating | 500 | 1660 | Cr: 16, Zn: 50 | 2.00 | 0.26 |
| Example 3 | Ni—Co alloy plating | 600 | 1700 | Cr: 16, Zn: 50 | 2.80 | 0.39 |
| Example 4 | Ni | 850 | 1950 | Cr: 21, Zn: 80 | 2.65 | 0.38 |
| Example 5 | Zn—Ni alloy plating | 550 | 1505 | Cr: 23, Zn: 90 | 3.10 | 0.46 |
| Example 6 | Ni—Co alloy plating | 500 | 1660 | Cr: 16, Zn: 50 | 1.80 | 0.26 |
| Example 7 | Ni—Co alloy plating | 600 | 1700 | Cr: 16, Zn: 50 | 2.70 | 0.38 |
| Example 8 | Ni—Co alloy plating | 700 | 1950 | W: 1 | 2.40 | 0.37 |
| Example 9 | Ni—Co alloy plating | 250 | 2000 | Mo: 250, As: 1 | 2.00 | 0.26 |

TABLE 1-continued

| | | | | | | |
|---|---|---|---|---|---|---|
| Example 10 | Ni—Co alloy plating | 600 | 1700 | Ti: 6 | 2.80 | 0.39 |
| Example 11 | Ni | 850 | 1950 | Cr: 50 | 2.65 | 0.38 |
| Example 12 | Zn—Ni alloy plating | 3500 | 0 | P: 50, Zn: 250 | 3.10 | 0.46 |
| Example 13 | Ni—Co alloy plating | 500 | 1660 | Mo: 250 | 1.80 | 0.26 |
| Example 14 | Ni—Co alloy plating | 1900 | 0 | W: 100 | 2.90 | 0.42 |
| Comparative Example 1 | — | — | — | 0 | 1.92 | 0.25 |
| Comparative Example 2 | Ni—Co alloy plating | 1025 | 3100 | Cr: 24 | 1.78 | 0.23 |
| Comparative Example 3 | Ni—Co alloy plating | 200 | 2800 | Cr: 20 | 1.58 | 0.19 |
| Comparative Example 4 | — | 0 | 0 | 0 | 3.32 | 0.41 |
| Comparative Example 5 | Ni—Co alloy plating | 3050 in terms of total attached amount | | — | 1.85 | 0.25 |

| | Detachment of particles | | | Presence of oxidative discoloration after heating for |
|---|---|---|---|---|
| | Tape test | Confirmation of transfer roll | Adhesiveness | evaluating heat resisteance |
| Example 1 | S | S | SS | A |
| Example 2 | S | S | SS | A |
| Example 3 | S | S | SS | A |
| Example 4 | S | S | SS | A |
| Example 5 | S | S | A | A |
| Example 6 | S | S | S | A |
| Example 7 | S | S | SS | A |
| Example 8 | S | S | SS | A |
| Example 9 | S | S | SS | A |
| Example 10 | S | S | SS | A |
| Example 11 | S | S | SS | A |
| Example 12 | S | S | A | A |
| Example 13 | S | S | S | A |
| Example 14 | S | S | S | A |
| Comparative Example 1 | C | C | B | C |
| Comparative Example 2 | C | C | C | A |
| Comparative Example 3 | S | S | B | A |
| Comparative Example 4 | S | S | B | C |
| Comparative Example 5 | A | B | B | B |

Evaluation Results

In all Examples 1 to 14, the evaluation of particle detachment was good, the adhesiveness to an active substance was good, and the heat resistance was good.

In Comparative Example 1, since the secondary particle layer was not provided, the ten-point average roughness Rz and the arithmetic average roughness Ra were outside the prescribed ranges, and thereby the evaluation of particle detachment and the adhesiveness were poor. Since the secondary particle layer was not provided, and the cover plating was not provided, the heat resistance was poor.

In Comparative Example 2, since the primary particle layer was not provided, the ten-point average roughness Rz was outside the prescribed range, and thereby the evaluation of particle detachment and the adhesiveness were poor.

In Comparative Example 3, the ten-point average roughness Rz and the arithmetic average roughness Ra were outside the prescribed ranges although the primary particle layer and the secondary particle layer were provided, and thereby the evaluation of the adhesiveness was only "B".

In Comparative Example 4, the ten-point average roughness Rz was in the prescribed range, but the primary particle layer and the secondary particle layer were not sequentially formed in this order only by the rolling process, and thereby the adhesiveness was poor. Since the cover plating was not provided, the heat resistance was poor.

In Comparative Example 5, the ten-point average roughness Rz was in the prescribed range, but the primary particle layer and the secondary particle layer were not sequentially formed under this plating condition, and thereby the adhesiveness was poor.

The invention claimed is:

1. A surface-treated copper foil for a battery cell, comprising
a copper foil and
a surface treatment layer on at least one surface of the copper foil, wherein
the surface treatment layer contains a primary particle layer formed of Cu and a secondary particle layer formed of Cu, Co, and Ni,
the surface of the surface treatment layer has a ten-point average roughness Rz of 1.8 µm or more measured with a laser microscope with a wavelength of 405 nm according to JIS B0601 1994, and
the surface of the surface treatment layer has an arithmetic average roughness Ra of 0.26 µm or more measured with a laser microscope with a wavelength of 405 nm according to JIS B0601 1994.

2. The surface-treated copper foil for a battery cell according to claim 1, wherein
the surface treatment layer contains one or more selected from the group consisting of Cu, W, Ti, As, V, Mo, Ni, Co, Cr, Zn, P, and Sn in a total amount of 100 µg/dm$^2$ or more and 10,000 µg/dm$^2$ or less,
the surface treatment layer contains a deposited amount of Ni of 100 µg/dm$^2$ or more and 4,500 µg/dm$^2$ or less, and
the surface treatment layer contains a deposited amount of Co of 100 µg/dm$^2$ or more and 6,000 µg/dm$^2$ or less.

3. The surface-treated copper foil for a battery cell according to claim 2, wherein
the surface of the surface treatment layer has a ten-point average roughness Rz of 1.9 µm or more and 3.30 µm or less measured with a laser microscope with a wavelength of 405 nm according to JIS B0601 1994, and
the surface of the surface treatment layer has an arithmetic average roughness Ra of 0.45 µm or less measured with a laser microscope with a wavelength of 405 nm according to JIS B0601 1994.

4. The surface-treated copper foil for a battery cell according to claim 3, wherein
the surface of the surface treatment layer has a ten-point average roughness Rz of 2.85 µm or less measured with a laser microscope with a wavelength of 405 nm according to JIS B0601 1994, and
the surface of the surface treatment layer has an arithmetic average roughness Ra of 0.41 µm or less measured with a laser microscope with a wavelength of 405 nm according to JIS B0601 1994.

5. The surface-treated copper foil for a battery cell according to claim 1, wherein the surface-treated copper foil satisfies at least one of the following conditions (A) and (B):
(A) the primary particle layer further contains one or more selected from the group consisting of W, Ti, As, V, Mo, Ni, Co, Cr, Zn, P, and Sn, and
(B) the secondary particle layer further contains one or more selected from the group consisting of W, Ti, As, V, Mo, Cr, Zn, P, and Sn.

6. The surface-treated copper foil for a battery cell according to claim 1, wherein the surface-treated copper foil satisfies at least one of the following conditions (C) and (D):
(C) the surface treatment layer contains one or more selected from the group consisting of Cu, W, Ti, As, V, Mo, Ni, Co, Cr, Zn, P, and Sn in a total amount of 100 µg/dm$^2$ or more, and
(D) the surface treatment layer contains one or more selected from the group consisting of Cu, W, Ti, As, V, Mo, Ni, Co, Cr, Zn, P, and Sn in a total amount of 10,000 µg/dm$^2$ or less.

7. The surface-treated copper foil for a battery cell according to claim 1, wherein the surface-treated copper foil satisfies at least one of the following conditions (E) and (F):

(E) the surface treatment layer contains a deposited amount of Ni of 100 µg/dm$^2$ or more, and
(F) the surface treatment layer contains a deposited amount of Ni of 4,500 µg/dm$^2$ or less.

8. The surface-treated copper foil for a battery cell according to claim 1, wherein the surface-treated copper foil satisfies at least one of the following conditions (G) and (H):
(G) the surface treatment layer contains a deposited amount of Co of 100 µg/dm$^2$ or more, and
(H) the surface treatment layer contains a deposited amount of Co of 6,000 µg/dm$^2$ or less.

9. The surface-treated copper foil for a battery cell according to claim 1, wherein the copper foil contains at least one selected from the group consisting of In, Au, Pd, Ag, Cr, Fe, P, Ti, Sn, Zn, Mn, Mo, Co, Ni, Si, Zr, B, and Mg in a total amount of 5 ppm by mass or more and 0.3% by mass or less.

10. The surface-treated copper foil for a battery cell according to claim 1, wherein the copper foil contains at least one selected from the group consisting of In, Au, Pd, Ag, Cr, Fe, P, Ti, Sn, Zn, Mn, Mo, Co, Ni, Si, Zr, B, and Mg in a total amount of 5 ppm by mass or more and 300 ppm by mass or less.

11. The surface-treated copper foil for a battery cell according to claim 1, wherein the copper foil contains at least one selected from the group consisting of In, Au, Pd, Ag, Cr, Fe, P, Ti, Sn, Zn, Mn, Mo, Co, Ni, Si, Zr, B, and Mg in a total amount of 301 ppm by mass or more and 0.3% by mass or less.

12. The surface-treated copper foil for a battery cell according to claim 1, wherein the surface treatment layer further contains one or more layers selected from the group consisting of a heat resistant layer, a rust preventing layer, a chromate treatment layer, a silane coupling treatment layer, a plated layer, and a resin layer, on the secondary particle layer.

13. The surface-treated copper foil for a battery cell according to claim 1, wherein the surface-treated copper foil for a battery cell is for a secondary cell or for a current collector of a secondary cell.

14. A current collector comprising the surface-treated copper foil for a battery cell according to claim 1.

15. An electrode comprising the surface-treated copper foil for a battery cell according to claim 1.

16. A battery cell comprising any one of the following items (I) to (K):
(I) the surface-treated copper foil for a battery cell according to claim 1,
(J) a current collector containing the surface-treated copper foil for a battery cell according to claim 1, and
(K) an electrode containing the surface-treated copper foil for a battery cell according to claim 1.

* * * * *